United States Patent [19]

Kwan

[11] Patent Number: 4,751,603
[45] Date of Patent: Jun. 14, 1988

[54] SAFETY DEVICES

[75] Inventor: David Kwan, Chaiwan, Hong Kong

[73] Assignee: Simatelex Manufactory Company Limited, Hong Kong

[21] Appl. No.: 50,103

[22] Filed: May 15, 1987

[30] Foreign Application Priority Data

Jul. 7, 1986 [GB] United Kingdom ................ 8616523
Jan. 8, 1987 [GB] United Kingdom ................ 8700318

[51] Int. Cl.⁴ .............................................. H02H 3/16
[52] U.S. Cl. ...................................... 361/42; 361/50;
361/104; 307/116; 307/118; 337/190
[58] Field of Search .......................... 361/42, 48–50,
361/115, 103, 104, 178; 307/116, 118, 326;
340/604, 605, 650; 337/156, 157, 190

[56] References Cited

U.S. PATENT DOCUMENTS

| | | | |
|---|---|---|---|
| 3,477,054 | 11/1969 | Bramhall et al. | 337/190 |
| 3,493,815 | 2/1970 | Hurtle | 361/55 |
| 4,169,261 | 9/1979 | Alpaugh | 340/605 X |
| 4,219,857 | 8/1980 | Haraldsson et al. | 361/50 X |
| 4,270,158 | 5/1981 | Gillardoni | 361/178 |
| 4,464,582 | 8/1984 | Aragaki et al. | 307/118 |
| 4,550,358 | 10/1985 | Crowley et al. | 361/42 |

FOREIGN PATENT DOCUMENTS 0001831 1/1982 European Pat. Off. .
WO83/03160 9/1983 PCT Int'l Appl. .

Primary Examiner—A. D. Pellinen
Assistant Examiner—Todd E. De Boer

[57] ABSTRACT

Hand-held electrical apparatus having an electrical detector in the form of a conductive sensor adjacent to any exposed electrical part so that if the apparatus becomes wet or damp the water will form path of conduction between the exposed electrical part and the sensor. A conductive path from the sensor forming part of the supply lead to the plug, and the plug comprising normally closed mechanical switch at least in the live line from the mains supply to the supply lead to the apparatus and a control circuit connected to the said sensor by the conductive path which open the switch as a result of the conductive path having been formed from the exposed electrical part because of the presence of moisture. The switch comprises a length of wire holding electrical contacts closed against the action of a spring. The control circuit fuse the wire, however, to allow the spring to open the contacts when the conductive path is established. A circuit board is slidably mounted in the plug and carries one of the pair of electrical contacts and the components of the control circuit, the wire holding the circuit board against the action of the spring to keep the mechanical switch in its closed position.

13 Claims, 4 Drawing Sheets

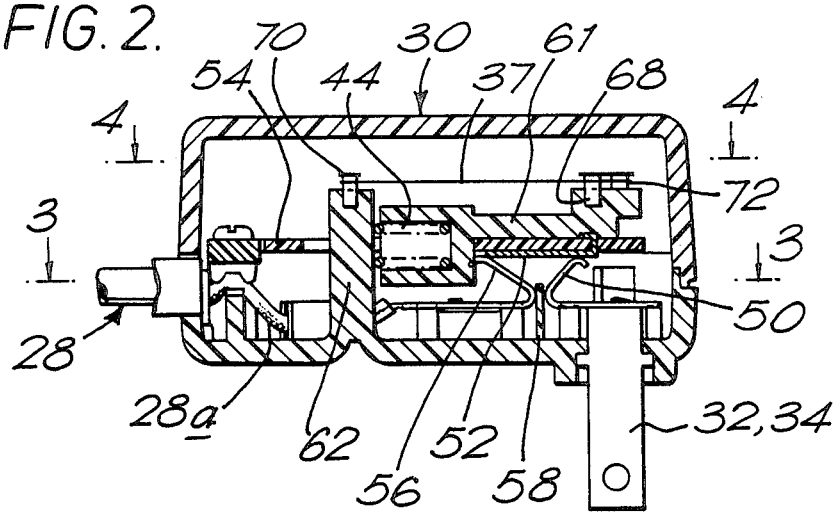
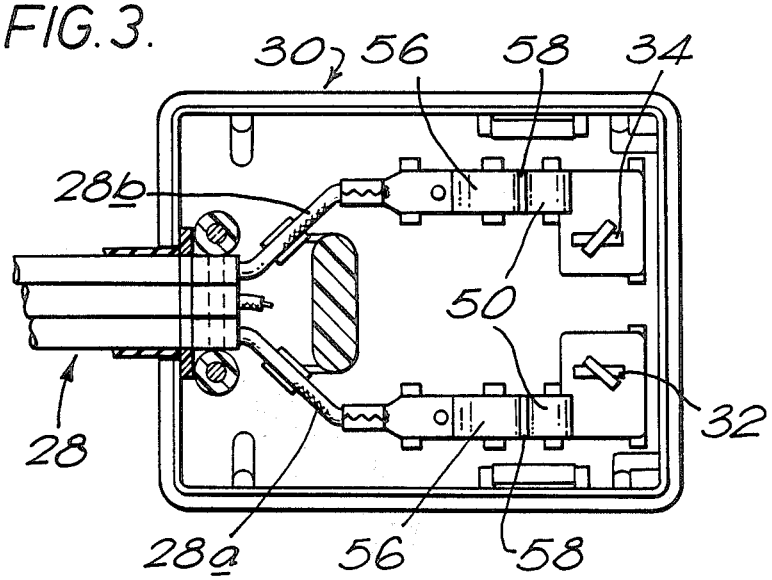

SAFETY DEVICES

This invention relates to safety devices for domestic electrical apparatus.

BACKGROUND TO THE INVENTION

There is a danger with hand-held electrical apparatus like hair driers that the user can receive an electric shock if the apparatus becomes wet, e.g. if it is laid on a wet patch or falls into a water-filled basin or the like. For this reason, it is proposed by new regulations that such apparatus should have a safety device for automatically isolating the mains supply in the event of the apparatus becoming wet and so liable to give a shock to the user.

The invention has therefore been made with this aspect in mind and aims to provide such a safety device.

BRIEF SUMMARY OF THE INVENTION

According to the invention there is provided a hand-held electrical apparatus to be connected to a mains supply by an electrical supply lead and plug, the apparatus having an electrical detector in the form of a conductive sensor adjacent to any exposed electrical part whereby if the apparatus becomes wet or damp the water will form a path of conduction between the exposed electrical part and the sensor, a conductive path from the sensor forming part of the supply lead to the plug, and the plug comprising a mechanical switch at least in the live line from the mains supply to the supply lead to the apparatus, the mechanical switch comprising a length of wire holding electrical contacts between the mains supply and the apparatus closed against the action of resilient means urging those contacts to an open position, control means connected to the sensor by the conductive path which will subject the wire to a high current when a path of conduction between an exposed electrical part and the sensor is established, whereby the wire will then break or lose its mechanical strength and so allow the mechanical switch to open, and a circuit board mounted so as to be movable within the plug between a closed position where at least one contact carried by it electrically engages a contact joined to at least one supply pin of the plug and an open position where those contacts are out of engagement so isolating at least the live supply lead to the apparatus from the supply, the board being urged from its closed position to its open position by a spring, the length of wire holding the board in the closed position against the action of the spring and so releasing the board to move to its open position when subjected to a high circuit by the control means.

An advantage of the invention is that little change is required in the piece of hand-held apparatus, e.g. the hair drier. Thus it is only necessary to include the sensor in it and no further change is required. Since this sensor can be, for example, a piece of conductive material, e.g. metal, foil, sheet, mesh or the like, it can be of insignificant weight and thickness. Therefore it can readily be fitted into existing hair drier housings and a three-core supply lead used to connect the apparatus to the plug so as to provide a third wire for connecting the sensor to the plug which contains the switch means and control means.

The switch means and control means can be relatively compact and light-weight but inevitably if included in the apparatus body itself would be liable to require changes in size and shape for this. Also, they would add to the weight to be held and manipulated which with, for example, a hair drier is disadvantageous. This is avoided according to the invention by including them in the plug which can be slightly larger than normal.

Preferably the switch means control both the live and the neutral lines from the mains supply so that it is not necessary for the plug to be a polarised plug which can only be inserted one way round in a socket.

In one embodiment of the invention, the control means comprise an SCR device in series across the mains supply with the length of wire, the gate of the SCR device being connected to the sensor, whereby the SCR device is normally non-conductive but is rendered conductive when the said path of conduction is established so that a high current passes through the length of wire which melts or otherwise looses its mechanical strength. For greater safety, however, a pair of SCR devices may be provided in parallel and the parallel devices are in series with the said wire, one SCR device being rendered conductive when the said path of conduction is established with the live of the mains supply and the other SCR device being rendered conductive when the said path of conduction is established with the neutral of the mains supply.

According to a preferred embodiment, the circuit board is mounted so as to be slidable in a direction parallel to the planar surfaces of the board, and in which one of the contacts is a conductive stripe formed in one surface of the board, the other contact resiliently engaging that stripe in the closed position of the board and being out of contact with the stripe when the board is in the open position. Additionally a stationary resilient contact joined to a pin of the plug bears on the conductive stripe in the open and closed positions of the board. To reduce the risk of the wire stretching, the wire preferably passes a plurality of times between one or more stationary supports on the plug and one or more supports on the circuit board so as to provide a higher mechanical advantage than for a single pass of the wire, for example, the wire passes to provide at least a four-fold mechanical advantage.

BRIEF DESCRIPTION OF THE DRAWINGS

The invention will now be described, by way of example, with reference to the accompanying drawings, in which:

FIG. 2 an enlarged sectional elevation through the plug used in the embodiment of FIG. 1;

FIG. 3 is a section taken on the line 3—3 of FIG. 2;

DESCRIPTION OF THE PREFERRED EMBODIMENT

Figure 1:
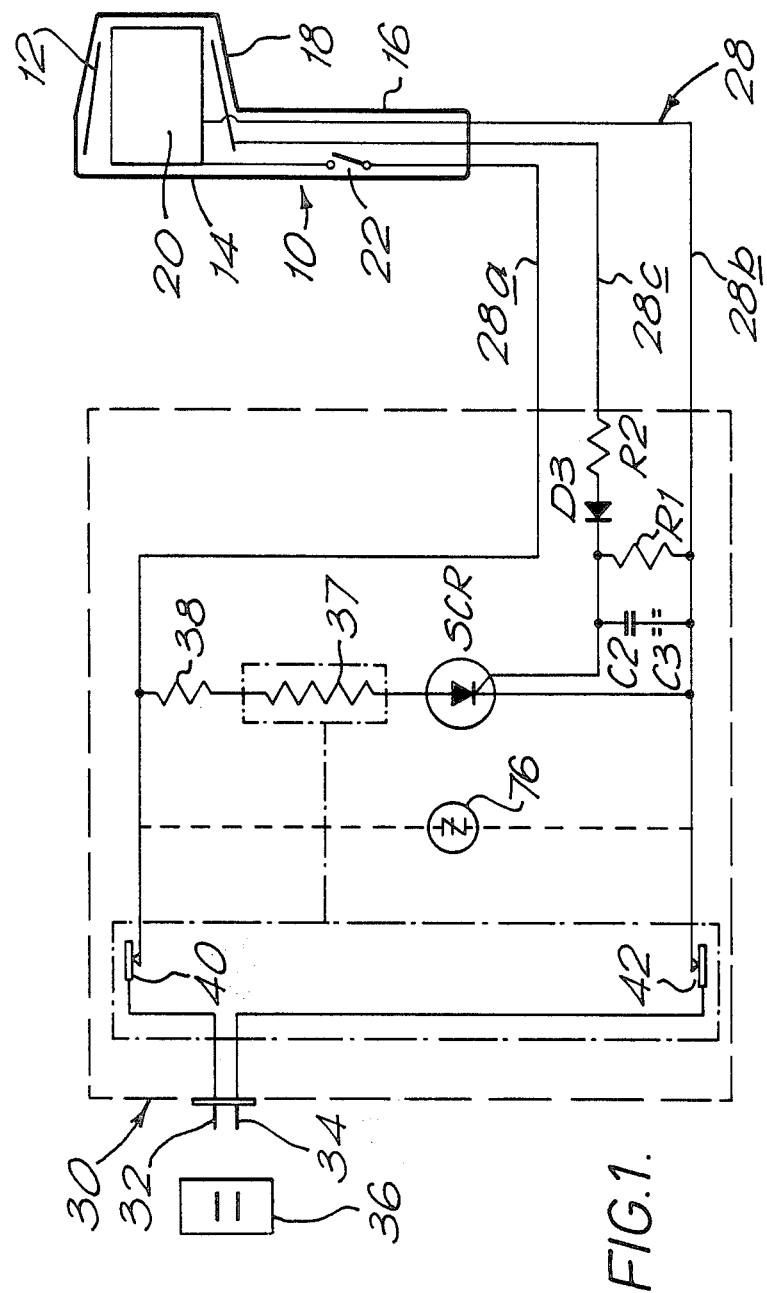
FIG. 1 is a circuit diagram of one embodiment of the invention.

The hair drier 10 can be of conventional construction apart from the presence of a sensor 12 as described below. Thus it comprises a housing 14 having a handle 16 to be grasped and held by the user and a portion 18 containing an electric motor and fan and heating coils 20, not shown in detail because they can be of conventional construction. A manually controlled on/off switch 22 is provided on the handle 16.

The hair drier 10 is connected by a three-cored supply lead 28 to a plug 30 having normal blades or pins 32 and 34 for connection to a mains power output socket 36. The power supply to the hair drier is through wires 28a and 28b which are normally connected to the pins 32 and 34.

Within the portion 18 of the hair drier housing is provided the sensor 12. This is in the form of a thin metal mesh, grid or foil in the shape of a cone or sleeve surrounding the motor and heating coils 20. These shapes and position are not essential, however, and the sensor can be in any appropriate shape or size to surround or be near whatever parts within the hair drier are likely to be "live" or exposed. As an example, it can be a 0.008 inch (0.2 mm) thick metal sheet which encompasses at least 80% of the conventional mica sheet wrapping of the heating coils. These latter contain exposed electrical parts and, should moisture enter the housing 14, this will provide a path of conduction between those parts and the sensor 12, whose potential will therefore rise towards the mains potential.

To detect this, the plug 30 is connected to the sensor by a third core 28c. This core is connected via a current limiting resistor R2 and diode D3 to prevent reverse current to the gate of an SCR device. Additionally, a resistor R1 is provided parallel to a capacitor C2 and across the core 28c to the sensor and the wire 28b to provide a damping function.

In series with the SCR device is a length of resistance heating wire or fuse wire 37 and optionally a current limiting resistor 38. Normally the SCR device will be non-conductive but, when the potential on its base rises, it will become conductive and so is capable of passing a high current because it is connected across the voltage of the mains supply, i.e. between the wires 28a and 28b.

Figure 5:
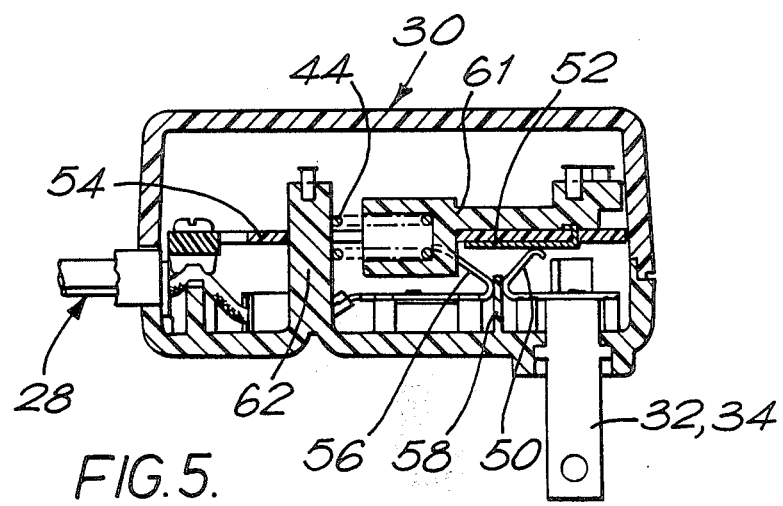
FIG. 5 is a view similar to FIG. 2 showing the plug in the position when the mains supply is isolated from the apparatus.

The wire 37 in turn controls the opening of two electrical contact pairs 40 and 42 in series with the lines from the pins 32 and 34 to the wires 28a and 28b in the manner to be described below. The contacts of these contact pairs 40 and 42 are normally held closed by the wire 37 but when the SCR device becomes conductive, the wire 37 will carry a high current and break and the contacts of the contact pairs 40 and 42 will be released and forced open by means of a spring 44 (see FIGS. 2 and 5). In this way the hair drier 10 will become insulated from the pins 32 and 34.

The plug 30 is shown in more detail in FIGS. 2 to 5. Directly connected to the pins 32 and 34 are spring contacts 50 which normally engage corresponding contact strips 52 on the underside of a circuit board 54. In turn further spring contacts 56 normally engage the corresponding strips 52 and are themselves directly connected both to the wires 28a and 28b and to the circuit board and components (not shown) mounted on the circuit board by connectors (not shown). The contact pairs 52 and 56 constitute the electrical contact pairs 40 and 42. The contacts 56 are insulated from the contacts 50 by means of upright insulating strips 58.

Figure 4:
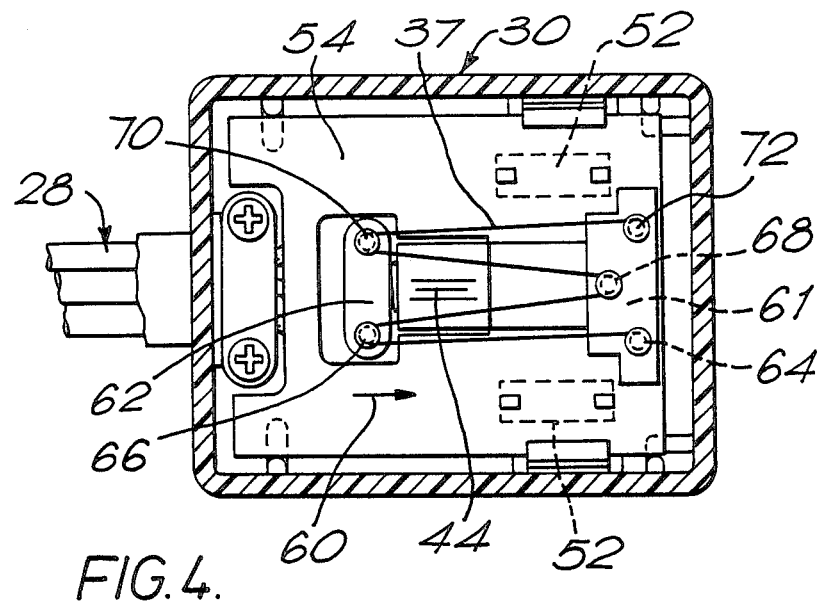
FIG. 4 is a section taken on the line 4—4 of FIG. 2.

The circuit board 54 carries the various circuit components shown in FIG. 1 but for simplicity these are not shown in FIGS. 2 to 5. The board is mounted so as to be slidable in the direction of the arrow 60 (FIG. 4). It is urged in this direction by the spring 44 which is compressed between an insulated body 61 mounted on the board and an upright post 62 integral with the body of the plug 30 and extending up through the board. The board, however, is held against the action of this spring by the length of wire 37.

This latter passes in a zig-zag fashion from a contact 64 mounted on the body 61 and connected to one strip 52 around an insulated peg 66 on the upright post 62 to a peg 68 on the board, back to another insulated peg 70 on the post 62 and finally to a contact 72 mounted on the body 61 and connected to the other strip 52.

The wire 37 is tightly positioned in the way and resists the action of the spring 44. However, when it breaks or loses its mechanical strength because it overheats when passing a high current when the SCR device becomes conductive, the spring 44 is then able to move the board in the direction of the arrow 60 to the position shown in FIG. 5. As a result of this movement, the strips 52 are no longer contacted by the spring contacts 56 and so the wires 28a and 28b and the hair drier and the components in the plug become isolated from the mains supply 36.

Also because the wire 37 passes in the zig-zag fashion, it acts in an analogous fashion to a pulley system or block and tackle. Thus, the tension in the wire 37 can be relatively low yet the spring 44 can be powerful since this wire resists the action of the spring with a four-fold mechanical advantage. This has the advantage that, despite the use of a strong enough spring 44 to ensure quick and certain action in isolating the hair drier from the mains supply, the tension in the wire can be low enough to avoid gradual mechanical creep or elongation. This is important since slight slow movement of the board could bring the contacts 52 and 56 to a point where arcing occurs during normal use which might weld these contacts together so that their opening will not occur even if the wire 37 breaks when the SCR device becomes conductive.

This arrangement is very simple and cheap and uses a minimum number of component parts. The arrangement is, however, very effective in isolating the hair drier should there be a leakage path established between the sensor 12 and a live component in the hair drier, e.g. because it has become wet, so avoiding the possibility of the user receiving a shock. Also it will be noted that when the hair drier is isolated in this way, the various circuit components in the plug are also isolated since they are energised downstream of the contact pairs 40 and 42.

The user cannot quickly re-establish operation but either needs to open the plug 30 to replace the wire 37 or preferably takes the hair drier to a qualified repairer who will repair or replace the plug. This can be a relatively inexpensive operation and avoids damage to the more expensive hair drier.

As an additional safety feature, a second capacitor C3 may be provided in series with the capacitor C2 so that should the capacitor C2 fail for some reason, the overall circuit will remain operative because of the presence of the capacitor C3 and it is unlikely that both will fail at the same time.

It may also be desirable to include a varistor 76 across lines from the pairs 32 and 34 to the wires 28a and 28b. This will prevent spike voltages from damaging the fuse wire 37 and causing it to open the contact pins 40 and 42 in the absence of a leakage path.

The arrangement is also largely insensitive to mechanical shocks since the inertia of the wire 37 is very low and so the wire is unlikely to break if the plug is dropped.

Figure 6:
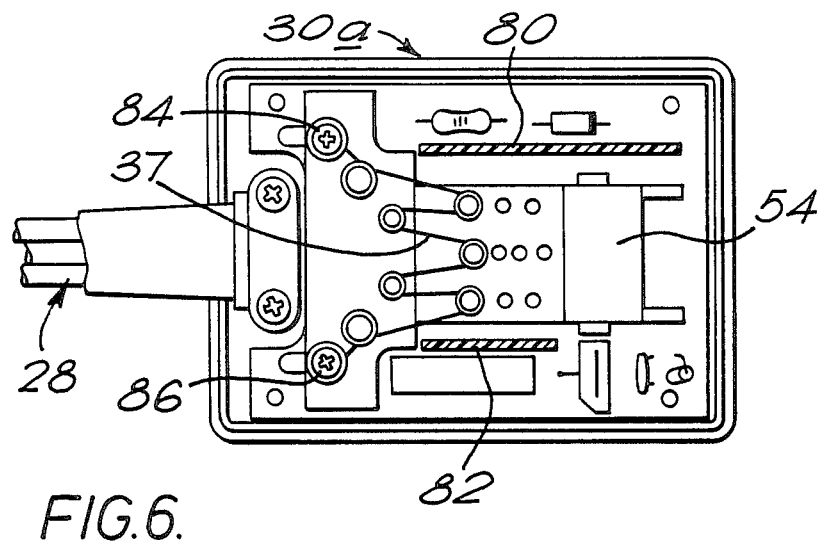
FIG. 6 is a circuit diagram of a modified embodiment according to the invention.

In the modified plug 30a shown in FIG. 6, the external cover has a pair of downwardly depending flanges 80 and 82. These are positioned on either side of the wire 37 and prevent any remnants of the board 54 when the wire fuses.

In addition, it will be seen that in the modified plug 30a, the wire has a six-fold mechanical advantage. Also, the wire extends between terminals 84 and 86 which are separate from the supports around which the wire passes to resist the resilient action of the spring.

In the modified embodiment shown in FIG. 7, the hair drier 10 is identical with that in the embodiment of FIG. 1 and so only the different components in the plug 30 and their operation will be described.

Figure 7:
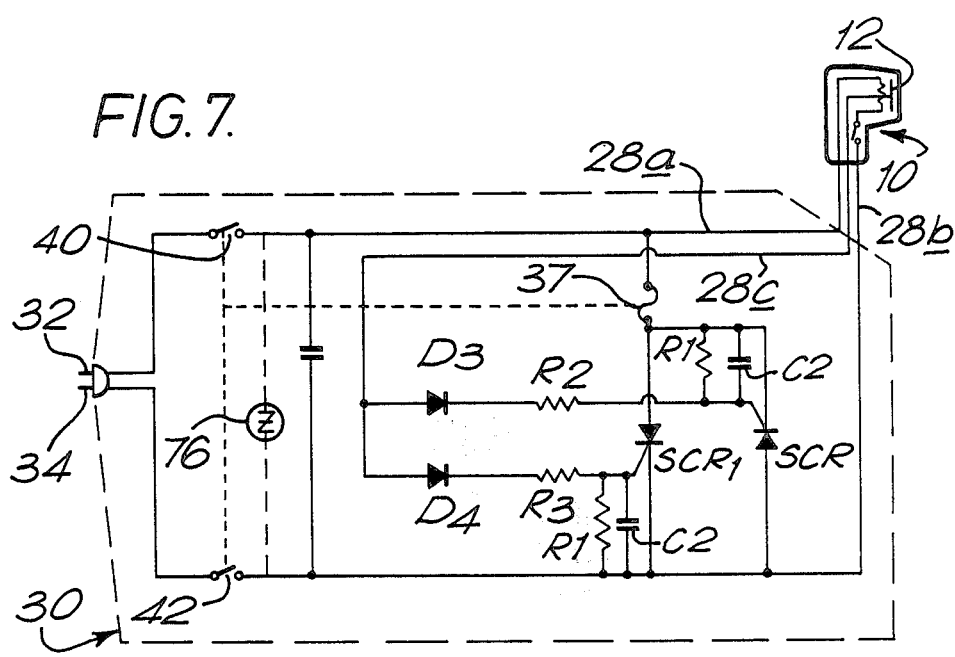
FIG. 7 is a circuit diagram of a further modified embodiment according to the invention.

As shown in FIG. 7, the SCR device is positioned and operates in exactly the same fashion as described in FIG. 1. Thus, when the voltage on the sensor rises because a leakage path from components at the same voltage as the live wire 28a is established, the SCR device becomes conductive and the wire 37 melts. However, in the event that the path of conduction from the sensor 12 is to a point which has a voltage very close to the neutral wire 28b, the SCR device might not fire.

Therefore, in the embodiment of FIG. 7, the SCR1 device is provided in parallel to the SCR device but inverted relative it. The gate of the SCR1 device is also connected to the sensor 12 through the diode D4 and current limiting resistor R3 which are analogous to the diode D3 and resistor R3. Then, in the event of the SCR device not firing because the sensor 12 is brought to a low voltage close to the neutral wire 28b, the SCR1 device will instead fire and so cause the wire 37 to melt.

An important advantage of the arrangement according to the invention is that apart from the provision of the sensor 12 and the extra core 28c in the supply lead 28, no change is required in the hair drier 10. Therefore existing designs of hair drier can be quickly and easily adapted and only insignificant changes in the weight and balance of an existing design need occur. The other parts can all be located within the plug 30 which can be of conventional size or only slightly larger than normal and this does not affect the weight or handling of the hair drier.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. Hand-held electrical apparatus to be connected to a mains supply, including an electrical supply lead and a plug having supply pins, the apparatus having an electrical detector in the form of a conductive sensor adjacent to any exposed electrical part whereby if the apparatus becomes wet or damp the water will form a path of conduction between the exposed electrical part and the sensor, a conductive path from the sensor forming part of the supply lead to the plug, and the plug comprising a mechanical switch at least in a live line of the supply lead to the apparatus, the mechanical switch comprising a length of wire holding electrical contacts closed against the action of resilient means urging those contacts to an open position, control means connected to the sensor by the conductive path which will subject the wire to a high current when a path of conduction between an exposed electrical part and the sensor is established, whereby the wire will then break or lose its mechanical strength and so allow the mechanical switch to open, and a circuit board mounted so as to be movable within the plug between a closed position where at least one contact carried by said circuit board electrically engages a contact joined to at least one supply pin of the plug and an open position where those contacts are out of engagement so isolating at least the live line to the apparatus from the supply pin, the board being urged from its closed position to its open position by a spring, the length of wire holding the board in the closed position against the action of the spring and so releasing the board to move to its open position when subjected to a high current by the control means.

2. Apparatus as claimed in claim 1 in which the control means comprise an SCR device in series across the supply pins with the length of wire, the gate of the SCR device being connected to the sensor, whereby the SCR device is normally non-conductive but is rendered conductive when the said path of conduction is established so that a high current passes through the length of wire which melts or otherwise loses its mechanical strength.

3. Apparatus as claimed in claim 2 in which a pair of SCR devices are provided in parallel and the parallel devices are in series with the said wire, one SCR device being rendered conductive when the said path of conduction is established with the live line of the supply lead and the other SCR device being rendered conductive when the said path of conduction is established with a neutral line of the supply lead.

4. Apparatus as claimed in claim 1 in which the circuit board is mounted so as to be slidable in a direction parallel to the planar surfaces of the board, and in which one of the contacts is a conductive strip formed on one surface of the board, the other contact resiliently engaging that strip in the closed position of the board and being out of contact with the strip when the board is in the open position.

5. Apparatus as claimed in claim 4 in which a stationary resilient contact joined to a pin of the plug bears on the conductive strip in the open and closed positions of the board.

6. Apparatus as claimed in claim 1 in which the wire passes a plurality of times between one or more stationary supports on the plug and one or more supports on the circuit board so as to provide a higher mechanical advantage than for a single pass of the wire.

7. Apparatus as claimed in claim 6 in which the wire passes to provide at least a four-fold mechanical advantage.

8. Apparatus as claimed in claim 1 further comprising at least one upstanding walls to screen the wire from circuit components.

9. Apparatus as claimed in claim 1 further comprising a varistor across the live line and a neutral line to prevent spike voltages in the supply from disrupting the said length of wire in the absence of the said path of conduction.

10. Apparatus as claimed in claim 1 in which the sensor is a piece of conductive foil, sheet or mesh positioned adjacent to any exposed live parts of the apparatus.

11. Apparatus as claimed in claim 1 in which the sensor is joined to the plug by a third wire in a three-core supply lead.

12. Apparatus as claimed in claim 1 in which the switch means operate on both the live line and a neutral line.

13. Apparatus as claimed in claim 1 which is a hand-held hair drier.

* * * * *